United States Patent [19]

Keating et al.

[11] Patent Number: 5,438,862
[45] Date of Patent: Aug. 8, 1995

[54] SYSTEM AND METHOD FOR IN SITU TESTING OF THE LEAK-TIGHTNESS OF A TUBULAR MEMBER

[75] Inventors: Robert F. Keating, Penn Township, Westmoreland County; David A. Snyder, North Huntingdon, both of Pa.

[73] Assignee: Westinghouse Elec Corp, Pittsburgh, Pa.

[21] Appl. No.: 195,498

[22] Filed: Feb. 14, 1994

[51] Int. Cl.$^6$ .......................... G01M 3/04; F24H 9/16
[52] U.S. Cl. .......................... 73/49.2; 73/46; 73/49.5
[58] Field of Search ................. 73/49.2, 49, 49.5, 49.8, 73/49.3, 49.5 R, 46

[56] References Cited

U.S. PATENT DOCUMENTS

| | | | |
|---|---|---|---|
| 3,919,880 | 11/1975 | Seyd et al. | 73/49.8 |
| 3,987,664 | 10/1976 | Hass et al. | 73/49.8 |
| 4,192,177 | 3/1980 | Crickard et al. | 73/49.5 |
| 4,192,373 | 3/1980 | Wolowodiuk | 165/70 |
| 4,382,379 | 5/1983 | Kelly | 73/46 |
| 4,548,069 | 10/1985 | Nousak | 73/49.5 |
| 4,574,618 | 3/1986 | Anthony et al. | 73/40.5 R |
| 4,581,919 | 4/1986 | Sullivan | 73/49.5 |
| 4,602,500 | 7/1986 | Kelly | 73/49.8 |
| 4,723,440 | 2/1988 | Bernshausen | 73/40 |
| 4,733,554 | 3/1988 | Lazes | 73/46 |
| 4,872,336 | 10/1989 | Baillie | 73/40.5 |
| 4,886,978 | 12/1989 | Kawamura | 290/52 |
| 5,029,614 | 7/1991 | Lara et al. | 138/90 |
| 5,081,864 | 1/1992 | Zaim | 73/40 |
| 5,083,451 | 1/1992 | Kling | 73/49.2 |
| 5,152,167 | 10/1992 | Moody | 73/40 |
| 5,279,147 | 1/1994 | Bertini et al. | 73/40 |

FOREIGN PATENT DOCUMENTS 2836508  3/1980  Germany ............... 73/49.5

OTHER PUBLICATIONS

U.S. patent application Ser. No. 07/986,151 titled "System and Method for Hydraulically Expanding Tubular Members" filed Nov. 30, 1992 in the name of David A. Snyder.

Primary Examiner—Hezron E. Williams
Assistant Examiner—J. David Wiggins
Attorney, Agent, or Firm—Walter S. Stevens

[57] ABSTRACT

System and method for in situ testing of the leak-tightness of a tubular member, which tubular member may be a nuclear steam generator heat transfer tube. The system includes a mandrel insertable into the tube, the mandrel having a pair of spaced-apart expandable bladders surrounding the mandrel. A first channel extends through the mandrel and is in communication with the bladders. A fluid supply circuit is in fluid communication with the first channel for supplying pressurized liquid to the bladders so that the bladders radially expand into sealing engagement with the inner diameter of the tube. As the bladders expand into sealing engagement with the tube, a sealed annular chamber is defined therebetween bounded by the bladders and the inner diameter of the tube. A second channel also extends through the mandrel, the second channel being in fluid communication with the fluid supply circuit at one end thereof and in communication with the chamber at the other and thereof in order to pressurize the chamber with the liquid. A controller is connected to the fluid supply circuit for measuring the flow rate of the liquid flowing through the fluid supply circuit to the chamber. Any crack in the tube wall adjacent the chamber will allow the liquid to escape therefrom at a characteristic flow rate corresponding to the size of the crack. However, the fluid supply circuit maintains the liquid pressure in the chamber so that the pressure and thus the liquid inventory in the chamber remains constant as the liquid leaks through the crack. The controller, which is connected to the flow meter, measures the flow rate and pressure of the liquid flowing through the fluid supply circuit. In view of the fact that the liquid (i.e., water) is incompressible, the flow rate through the crack and the pressure in the chamber are provided by measuring the flow rate and pressure of the liquid flowing through the fluid supply circuit.

13 Claims, 6 Drawing Sheets

SYSTEM AND METHOD FOR IN SITU TESTING OF THE LEAK-TIGHTNESS OF A TUBULAR MEMBER

BACKGROUND

This invention generally relates to leak testing and more particularly relates to a system and method for in situ testing of the leak-tightness and leak rate of a tubular member, which tubular member may be a heat transfer tube of the kind found in typical nuclear steam generators.

Although leak testing devices and methods are known, it has been observed that these devices and methods have a number of operational problems associated with them which make such devices and methods less than completely satisfactory for leak testing heat transfer tubes of the kind found in typical nuclear steam generators. However, before these problems can be appreciated, some background is desirable as to the structure and operation of a typical nuclear steam generator.

In this regard, a typical nuclear steam generator or heat exchanger generates steam when heat is transferred from a heated and radioactive primary fluid to a non-radioactive secondary fluid of lower temperature. The primary fluid flows through a plurality of U-shaped tubes disposed in the steam generator. The secondary fluid flows across the exterior surfaces of the tubes as the primary fluid flows through the tubes. The walls of the tubes function as heat conductors for transferring the heat from the heated primary fluid flowing through the tubes to the secondary fluid of lower temperature flowing across the exterior surfaces of the tubes. As the heat is transferred from the primary fluid to the secondary fluid, a portion of the secondary fluid vaporizes to steam for generating electricity in a manner well understood in the art.

Occasionally, due to tube wall cracking caused by stress and corrosion during operation (i.e., known in the art as primary water stress corrosion cracking), the steam generator tubes may degrade (i.e., experience tube wall thinning) and thus may not remain leak-tight. If through-wall cracking occurs due to the degradation, the radioactive primary fluid may undesirably leak through the crack and commingle with the nonradioactive secondary fluid.

Therefore, such leaking tubes may be plugged to prevent commingling the radioactive primary fluid with the nonradioactive secondary fluid. However, for safety reasons, technical specifications imposed by the United States Nuclear Regulatory Commission on each nuclear reactor power plant holding an operating license set a limit on the percentage of heat transfer tubes that may be plugged. Exceeding this technical specification limit jeopardizes the operating license of the power plant. It is therefore prudent to plug only those heat transfer tubes that require plugging.

However, it has been observed that not all leaking tubes require plugging because a small amount of tube leakage is tolerable. This is so because small amounts of tube leakage do not pose safety concerns. In view of this, the United States Nuclear Regulatory Commission has issued Draft Regulatory Guide 1.121 (NUREG-1477) which provides a basis for determining acceptable tube leakage in order to identify which degraded or leaking steam generator tubes must be plugged in order to satisfy safety requirements. In general, Draft Regulatory Guide 1.121 sets a limit for an acceptable leak rate at a specified pressure in the tube, the pressure being that which would be experienced during a postulated accident (e.g., main steam line break). Therefore, under the requirements of Draft Regulatory Guide 1.121, a degraded or leaking tube maybe "leak-rate tested" to determine whether or not the tube will have an acceptable leak rate during such a postulated accident. If the leak-rate is acceptable, then the leaking tube need not be plugged. Of course, it is desirable to perform such a leak-rate test in a precise and cost efficient manner.

Techniques for determining the leak rate from degraded nuclear steam generator tubes are known. In this regard, it is known that as an eddy current inspection probe is translated along the inner diameter of a tube, its voltage amplitude will increase when it passes a degraded portion of the tube. The degraded portion of the tube may have a through-wall crack which will allow fluid to leak therethrough at a flow rate related to the size of the crack and the fluid pressure within the tube. That is, the voltage amplitude will have a statistical correspondence with the flow rate through the crack at a given pressure. Thus, by knowing the voltage amplitude and internal tube pressure, one can determine the flow rate through the crack. In other words, the voltage amplitude of the eddy current probe can be correlated to a given flow rate and pressure. It is therefore possible to make a plurality of empirical or experimental measurements of voltage, leak-rate and pressure to establish a data base of flow rate as a function of eddy current voltage and anticipated pressures. Such a database can then be used in the field to conveniently determine the anticipated leak rate at the pressure of interest merely by measuring the voltage amplitude, as explained more fully hereinbelow. Typical prior art methods of gathering the empirical data to establish the data base are discussed hereinbelow.

It is important to precisely and cost-effectively determine the empirical data for the data base. However, two prior art methods typically used to obtain the empirical data for the previously mentioned data base are costly and may be imprecise. One of these prior art methods entails constructing a bench-scale model steam generator and then inducing through-wall degradation in the tubes that are disposed in the model steam generator. Eddy current voltage amplitude measurements of the degradation are then made by passing an eddy current probe through the tube. Next, the degraded tube is pressurized at a plurality of pressure values and the pressures and leak rates measured. The eddy current voltage amplitude, pressures and leak rates are recorded in a data base. However, a problem with this method is that the bench-scale model steam generator is constructed at a not insignificant expense and the empirical data obtained may or may not be truly representative of the real conditions in a full-sized steam generator belonging to an actual operating nuclear power plant.

Another prior art method of establishing the data base entails inserting an eddy current probe into a degraded tube of a full-sized steam generator belonging to an actual power plant to obtain the required voltage reading and then removing the tube from the steam generator. Once the tube is removed, the tube is leak-rate tested in order to establish the previously mentioned leak rate and pressure values for the data base. However, applicants have observed that the process of removing the tube to be examined may result in a change in morphology of the degraded portion of the tube such that the morphology of the degraded portion of the tube after removal is not the same as before the tube is removed. This may occur, for example, when a network of cracks in the degraded portion of the tube are connected by ligaments which become torn during the removal process. Thus, the morphology of the tube after removal may be different than before removal. Applicants have confirmed this phenomenon by observing that eddy current voltage amplitudes are sometimes larger after removal than before removal. Therefore, this second prior art method of establishing the data base may cause the data base to be imprecise and is therefore not preferred. In addition, this second prior art method of establishing the data base cannot be conveniently performed in situ; that is, the tube must be removed. Moreover, the process of removing the tube is time consuming and necessitates that the steam generator betaken off-line for an extended period of time. Each day that the steam generator is off-line requires the reactor owner to incur approximately $1,000,000 in replacement power costs.

Therefore, a problem in the art is to provide a technique for steam generator tube in situ leak-rate testing that is precise and cost effective in order to establish the data base while overcoming the disadvantages of the prior art.

After the data base is established, an eddy current measurement is performed in the field on a preselected steam generator tube to obtain the voltage amplitude measurement. Next, the voltage amplitude is looked-up or found in the data base to obtain an anticipated leak flow rate at an anticipated pressure (e.g., pressure during a postulated accident). In this manner, the flow rate through a leaking steam generator tube of an operating power plant during a postulated accident may be determined simply by performing an eddy current inspection of the tube and then correlating that eddy current voltage amplitude to flow rate and pressure data existing in the data base. However, in order to establish the values for the data base, a plurality of steam generator tubes first must be leak-rate tested.

Yet another apparatus and method for testing the tightness of closed-end tubes in heat exchangers of nuclear reactors is disclosed in U.S. Pat. No. 3,919,880 titled "Method And Apparatus For Testing Closed-End Tubes In Heat Exchangers of Nuclear Reactors And The Like" issued Nov. 18, 1975 in the name of Günter Seyd, et al. This patent discloses a method and apparatus for detecting a leak in a heat exchanger tube of a nuclear reactor by inserting an expandable plug which seals off a closed region in the heat exchanger tube. A pressurized fluid is then introduced into the closed region, and the pressure of the fluid is monitored for detecting a leak through the closed end of the tube. However, this patent merely discloses testing for the leak-tightness of a closed-end tube with a fluid under pressure, and merely discloses sealing the tube at one point with an expandable plug and testing the area located between the expandable plug and the closed end of the tube to determine if the closed end of the tube permits leaking. This patent does not appear to disclose leak testing for fluid flow rate through a crack in the walls of an open-ended tube. Leak testing of an open-ended tube is required for leak testing steam generator heat transfer tubes in the manner satisfying Draft Regulatory Guide 1.121 (NUREG-1477).

Therefore, what is needed are a suitable system and method for in situ testing of the leak-tightness of a tubular member, which tubular member may be a heat transfer tube of the kind found in typical nuclear steam generators.

SUMMARY OF THE INVENTION

Disclosed herein are a system and method for in situ testing of the leak-tightness of a tubular member, which tubular member may be a nuclear steam generator heat transfer tube. The system includes a mandrel insertable into the tube, the mandrel having a pair of spaced-apart expandable bladders surrounding the mandrel. A first channel extends through the mandrel and is in communication with the bladders. A fluid supply circuit is in fluid communication with the first channel for supplying pressurized liquid to the bladders to pressurize the bladders so that the bladders radially expand into sealing engagement with the inner diameter of the tube. As the bladders expand into sealing engagement with the tube, a sealed annular chamber is defined between the bladders, which chamber is bounded by the bladders and the inner diameter of the tube. A second channel also extends through the mandrel, the second channel being in fluid communication with the fluid supply circuit at one end thereof and in communication with the chamber at the other and thereof in order to pressurize the chamber with the liquid. A controller is connected to the fluid supply circuit for measuring the flow rate of the liquid flowing through the fluid supply circuit to the chamber. Any crack in the tube wall adjacent the chamber will allow the liquid to escape therethrough at a characteristic flow rate corresponding to the size of the crack and the pressure in the tube. However, the fluid supply circuit maintains the liquid inventory and the liquid pressure in the chamber so that the liquid inventory and thus the pressure in the chamber remain constant as the liquid leaks through the crack. The controller, which is connected to a flow meter associated with the fluid supply circuit, measures the flow supply circuit, measures the flow rate and pressure of the liquid flowing through the fluid supply circuit. In view of the fact that the liquid (e.g. water) is practically incompressible, the flow rate through the crack and the pressure in the chamber are provided by measuring the flow rate and pressure of the liquid flowing through the fluid supply circuit.

In its broad form, the present invention is a system for in situ testing of the leak-tightness of a tubular member, comprising: (a) a body insertable into the tubular member; (b) seal means surrounding said body for sealingly engaging the tubular member to define a sealed chamber in the tubular member; (c) fluid supply means in fluid communication with the chamber for supplying a fluid to the chamber to pressurize the chamber to a predetermined pressure; and (d) control means connected to said fluid supply means for controlling said fluid supply means, so that the predetermined pressure is maintained in the chamber as a breach in the tubular member allows the fluid to leak from the chamber.

In its broad form, the present invention is also a method of testing the leak-tightness of a tubular member, comprising the steps of: (a) inserting a body into the tubular member; (b) defining a sealed chamber in the tubular member by engaging the tubular member with a pair of spaced-apart seals surrounding the body; (c) pressurizing the chamber by supplying a fluid to the chamber from a fluid supply reservoir in fluid communication with the chamber; and (d) maintaining a predetermined pressure in the chamber as a breach in the tubular member allows the fluid to leak from the chamber by controllably operating a controller connected to the fluid supply reservoir.

An object of the present invention is to provide a system and method for in situ testing of the leak-tightness of a tubular member, which tubular member may be a heat transfer tube of the kind found in typical nuclear steam generators.

Another object of the present invention is to provide a system and method for in situ testing of the leak-tightness of a nuclear steam generator heat transfer tube to obtain empirical data usable for satisfying the requirements of Draft Regulatory guide 1.121 (NUREG-1477).

A feature of the present invention is the provision of a mandrel insertable into the tube and spaced-apart expandable bladders surrounding the mandrel, the bladders capable of radially expanding into sealing engagement with the inner diameter of the tube to define a sealed annular chamber between the bladders.

Another feature of the present invention is the provision of a fluid supply circuit in fluid communication with the bladders and with the chamber to hydraulically pressurize the bladders and the chamber.

Yet another feature of the present invention is the provision of a flow meter connected to the fluid supply circuit for measuring the flow rate of the fluid flowing through the fluid supply circuit.

An advantage of the present invention is that empirical leak-rate data usable for satisfying Draft Regulatory Guide 1.121 (NUREG-1477) can now be obtained in a precise and cost effective manner.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings wherein:

DESCRIPTION OF THE PREFERRED EMBODIMENTS

Disclosed hereinbelow are a system and method for in situ testing of the leak-tightness of a tubular member, which tubular member may be a heat transfer tube of the kind found in typical nuclear steam generators.

Figure 1:
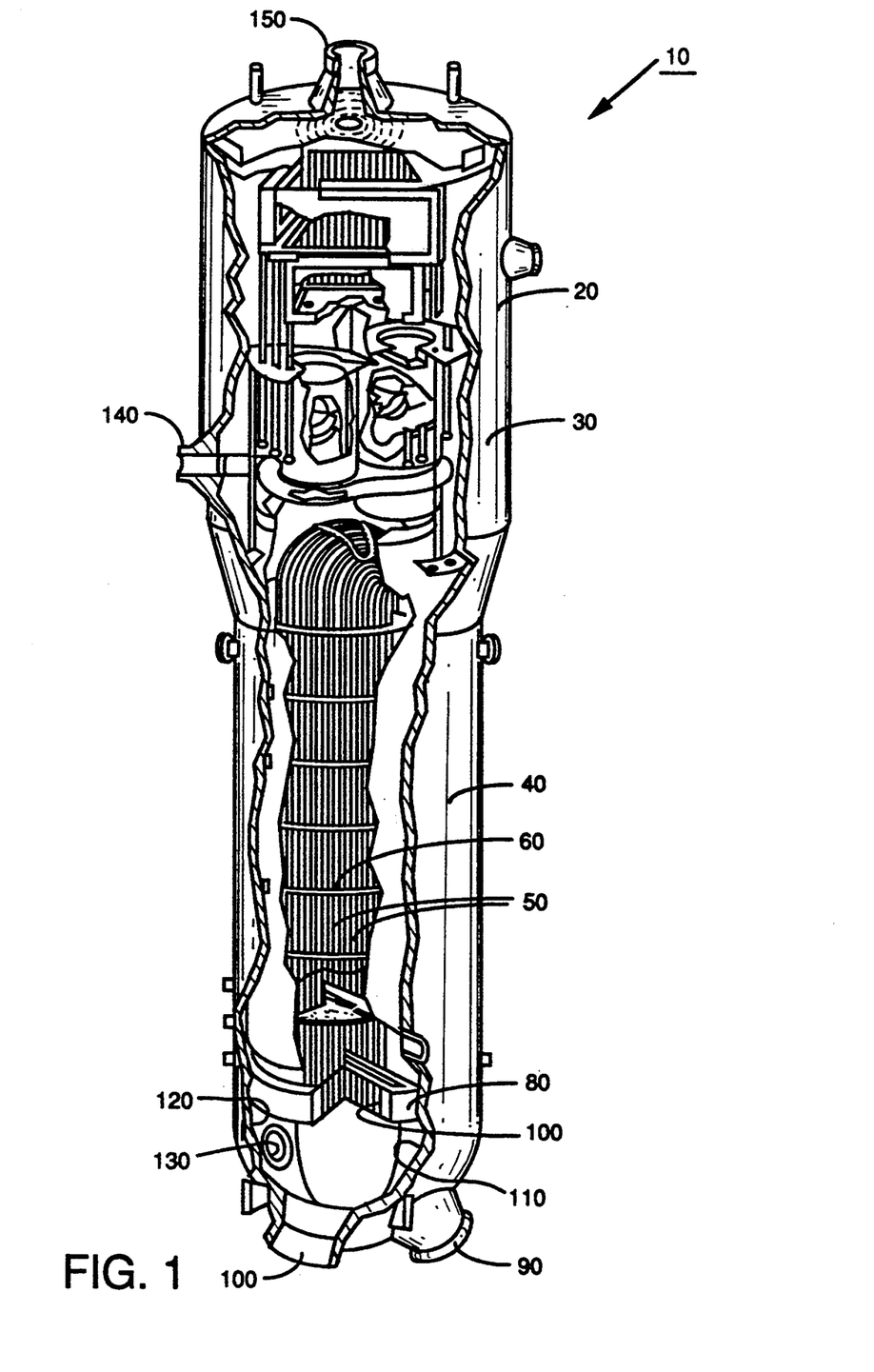
FIG. 1 is a perspective view in partial vertical section of a typical nuclear steam generator with parts removed for clarity, the steam generator having a plurality of U-shaped heat transfer tubes disposed therein.

Referring to FIG. 1, there is shown a typical nuclear steam generator, generally referred to as 10, for generating steam. Steam generator 10 comprises a hull 20 having an upper portion 30 and a lower portion 40. Disposed in hull 20 are a plurality of vertical U-shaped heat transfer tubes 50 that extend through a plurality of horizontal support plates 60. Each tube 50 has an inner diameter 70 (see FIG. 3). As shown in FIG. 1, disposed in lower portion 40 is a horizontal tube sheet 80 for supporting the ends of each tube 60. Disposed on hull 20 are a first inlet nozzle 90 and a first outlet nozzle 100 in fluid communication with an inlet plenum chamber 110 and with an outlet plenum chamber 120, respectively. A plurality of manway holes 130 are formed through hull 20 below tube sheet 80 for allowing access to inlet plenum chamber 110 and outlet plenum chamber 120. Moreover, formed through hull 20 above tube sheet 80 is a second inlet nozzle 140 for allowing entry of a nonradioactive secondary fluid (i.e., demineralized water) into hull 20. A second outlet nozzle 150 is disposed on the top of upper portion 30 for exit of steam from steam generator 10.

During operation of steam generator 10, pressurized and radioactive primary fluid (i.e., demineralized water) heated by a nuclear reactor core (not shown) enters inlet plenum chamber 110 through first inlet nozzle 90 and flows through tubes 50 to outlet plenum chamber 120 where the primary fluid exits steam generator 10 through first outlet nozzle 100. As the primary fluid enters inlet plenum chamber 110, the secondary fluid simultaneously enters second inlet nozzle 140 to ultimately surround tubes 50. A portion of this secondary fluid vaporizes into steam which rises upwardly to exit steam generator 10 through second outlet nozzle 150. The steam is piped to a turbine-generator set (not shown) for generating electricity in a manner well understood in the art. Moreover, the primary fluid is radioactive; therefore, for safety reasons, tubes 50 are designed to be leak-tight, so that the radioactive primary fluid does not commingle with the nonradioactive secondary fluid.

However, due to tube wall intergranular stress corrosion cracking, some of the tubes 70 may degrade and thus may not remain leak-tight. Therefore, such leaking tubes 70 may be plugged, if required, to prevent commingling the radioactive primary fluid with the nonradioactive secondary fluid. However, it has been observed that not all leaking tubes 70 require plugging because a small amount of tube leakage is tolerable. This is so because small amounts of tube leakage do not pose a safety concern in case of a postulated accident. In view of this, Draft Regulatory Guide 1.121 (NUREG-1477) allows a degraded or leaking tube to be "leak-rate tested" for determining whether or not the tube will have an acceptable leak rate during such a postulated accident (e.g., main steam line break) or during normal operation. If the anticipated leak-rate is acceptable, then the leaking tube need not be plugged. According to the invention, such a leak-rate test can now be performed in situ in a precise and cost efficient manner.

Figure 2:
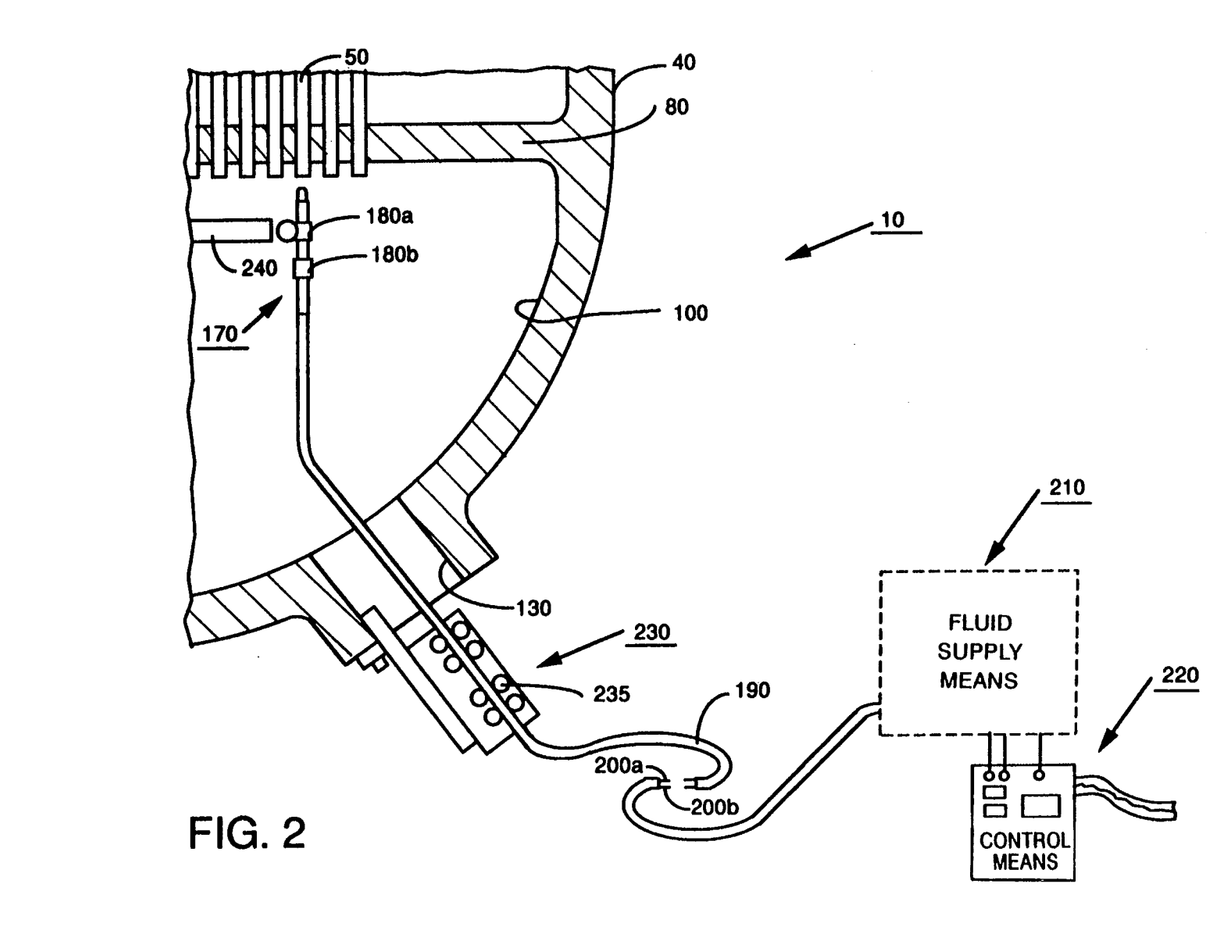
FIG. 2 illustrates the system of the invention in operative condition to leak test in situ a preselected one of the tubes.

Therefore, turning now to FIG. 2, there is shown the subject matter of the present invention, which is a system, generally referred to as 160, for in situ testing of the leak-tightness of a tubular member, which tubular member may be heat transfer tube 50 disposed in nuclear steam generator 10. System 160 comprises a body or mandrel, generally referred to as 170, insertable into tube 50 and having seal means, such as a pair of expandable bladders 180a/b, thereon for reasons described hereinbelow. Connected to mandrel 170 is a flexible protective hose 190 protectively surrounding two flexible fluid supply conduits 200a/b, for reasons described more fully hereinbelow. Hose 190 and conduits 200a/b are connected to fluid supply means, generally referred to as 210, for supplying fluid to mandrel 170, as disclosed in detail hereinbelow. Control means, generally referred to as 220, is connected to fluid supply means 210 for controlling fluid supply means 210. In addition, a hose driver, generally referred to as 230, includes at least one rotatable wheel 235 capable of engaging hose 190 for driving or translating hose 190 and the mandrel 170 connected thereto along the longitudinal axis of tube 50. Moreover, a support mechanism 240 is connected to mandrel 170 for aligning mandrel 170 coaxially with tube 50. Support mechanism 240 is also capable of supporting hose 190 and mandrel 170 as hose 190 and mandrel 170 are translated in tube 50. In this regard, support mechanism 240 may be a ROSA (Remotely Operated Service Arm) available from the Westinghouse Electric Corporation located in Pittsburgh, Pa. The structure and function of each of these major components of system 160 are described in more detail hereinbelow.

Figure 3:
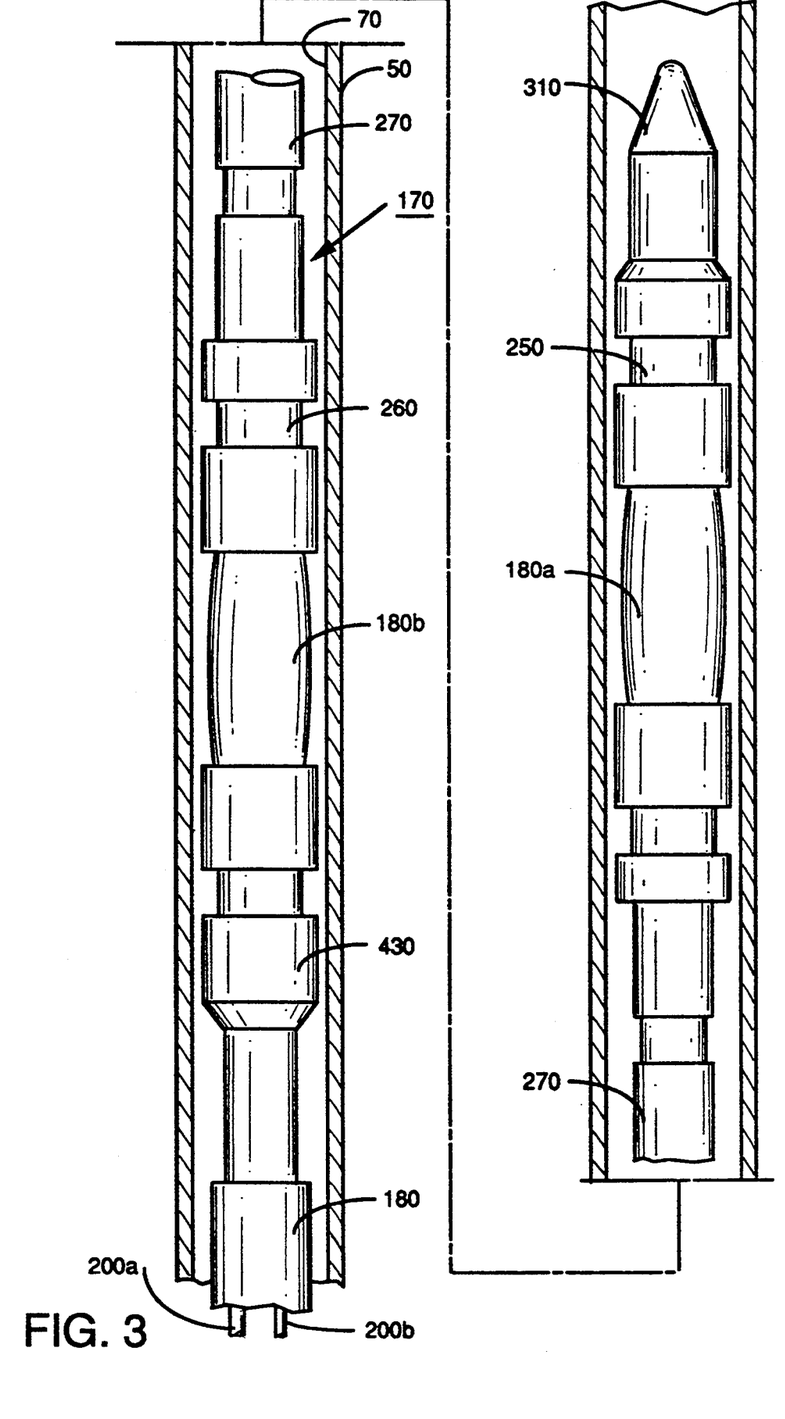
FIG. 3 shows in elevation a mandrel supporting a pair of expandable bladders thereon, the mandrel and bladders being disposed in the tube.
Figure 4:
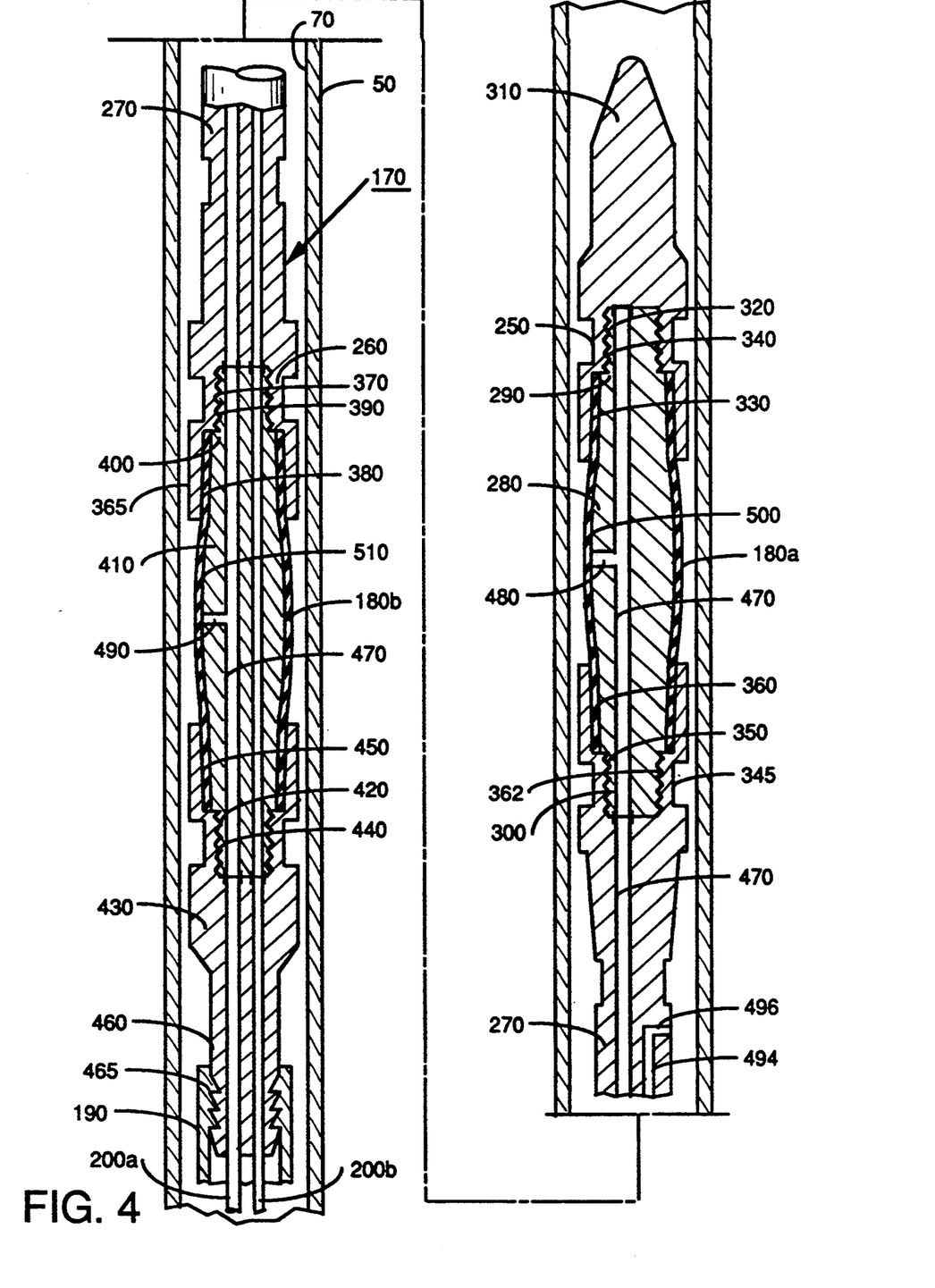
FIG. 4 shows in vertical section the mandrel and bladders disposed in the tube.

Referring to FIGS. 3 and 4, mandrel 170 comprises a generally cylindrical proximal end portion 250 and a generally cylindrical distal end portion 260 integrally interconnected by a generally cylindrical intermediate portion 270. It will be appreciated, with reference to the several figures, that the terminology "proximal end portion" is defined herein to mean that end portion disposed nearer the bottom of outlet plenum chamber 110 (or inlet plenum chamber 120) and that the terminology "distal end portion" is defined herein to mean that end portion disposed farther away from the bottom of outlet plenum chamber 110 (or inlet plenum chamber 120). Distal end portion 250 of mandrel 170 includes a generally cylindrical first central body 280 having an externally threaded distal end portion 290 and an externally threaded proximal end portion 300. Threadably connected to distal end portion 290 is a generally conical nose member 310 for easily inserting mandrel 170 into tube 50. Nose member 310 has a step bore 320 defining an unthreaded portion 330 therein for reasons disclosed presently. Step bore 320 also has an internally threaded portion 340 of smaller diameter than unthreaded portion 330 for threadably engaging the external threads of distal end portion 290 belonging to first central body 280. In this manner, nose member 310 is threadably connected to first central body 280. In addition, threadably connected to proximal end portion 300 of first central body 280 is the intermediate portion 270. A distal end portion 345 of intermediate portion 270 has a step bore 350 defining an unthreaded portion 360 therein for reasons disclosed presently. Step bore 350 also has an internally threaded portion 362 of smaller diameter than unthreaded portion 360 for threadably engaging the external threads of proximal end portion 300 which belongs to first central body 280. In this manner, intermediate portion 270 is threadably connected to first central body 280. Moreover, a proximal end portion 365 of intermediate portion 270 has a step bore 370 defining an unthreaded portion 380 therein for reasons disclosed presently. Step bore 370 also has an internally threaded portion 390 of smaller diameter than unthreaded portion 380 for threadably engaging the external threads of a proximal end portion 400 belonging to a generally cylindrical second central body 410. In this manner, intermediate portion 270 is threadably connectable to second central body 410. In addition, threadably connected to a proximal end portion 420 second central body 410 is a connector 430 having a step bore 440 defining an unthreaded portion 450 therein for reasons disclosed presently. Step bore 440 also has an internally threaded portion of smaller diameter than unthreaded portion 450 for threadably engaging the external threads of proximal end portion 420 which belongs to second central body 410. In this manner, connector 430 is threadably connected to second central body 410. A proximal end portion 460 of connector 430 may have a plurality of serrations 465 around the exterior surface thereof for engaging the inside surface of hose 190 in order to secure hose 190 to connector 430.

Figure 4A:
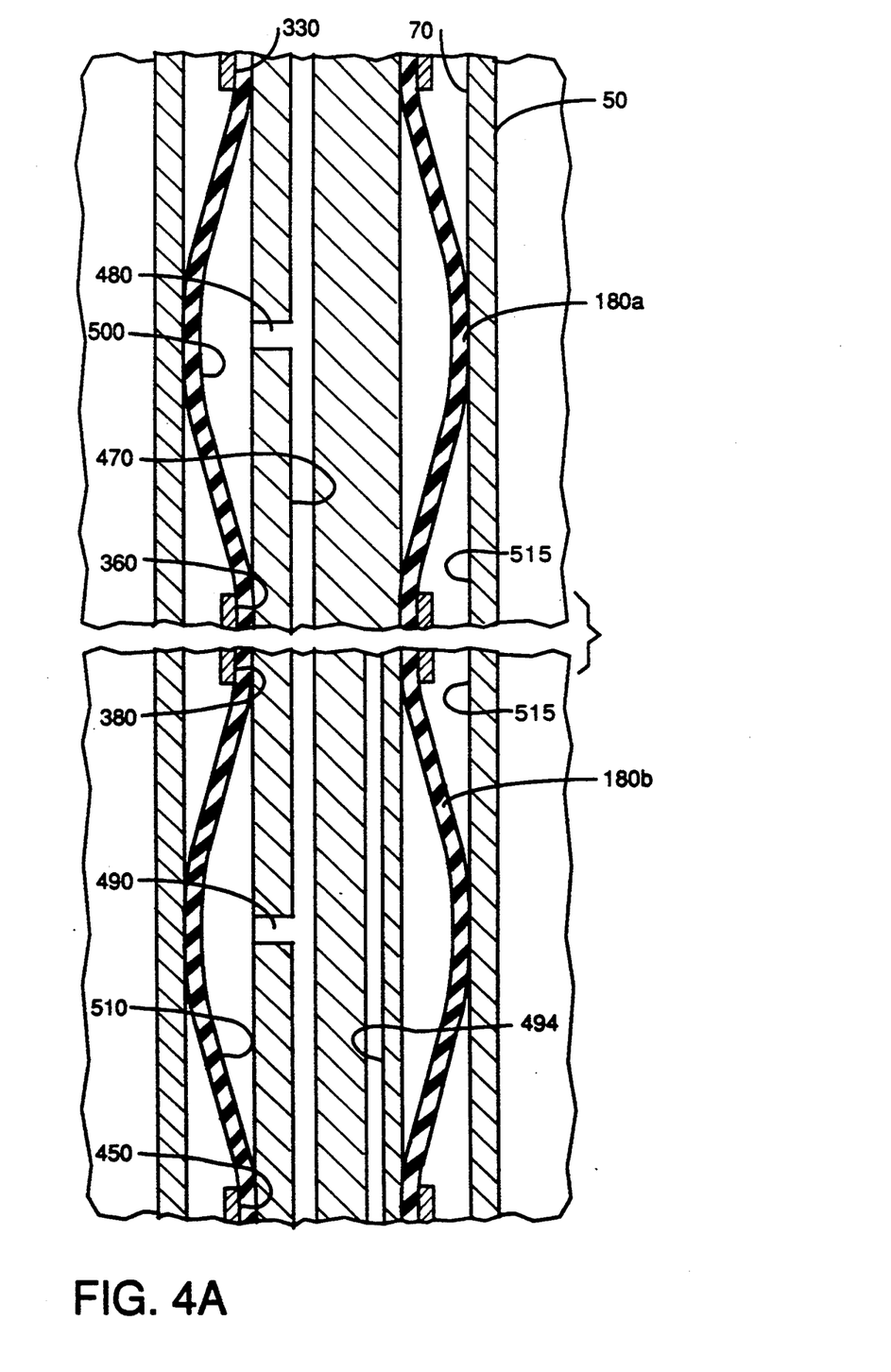
FIG. 4A is a fragmentation view in vertical section showing the mandrel and bladders disposed in the tube, the bladders being shown pressurized into intimate sealing engagement with the inner diameter of the tube to define an annular chamber bounded by the bladders and the inner diameter of the tube.

As best seen in FIGS. 4 and 4A, a first channel or flow passage 470 extends longitudinally through connector 430, second central body 410, intermediate portion 270 and first central body 280. First channel 470 is in communication with a first port 480 on the exterior surface of first central body 280 for conducting an incompressible fluid (e.g., water, oil or the like) to the exterior surface of first central body 280. First channel 470 is also in communication with a second port 490 on the exterior surface of second central body 410 for conducting the incompressible fluid to the exterior surface of second central body 410. As disclosed in more detail hereinbelow, first channel 470 is in fluid communication with fluid supply conduit 200a for supplying the fluid to first channel 470. Moreover, a second channel or flow passage 494 extends longitudinally through connector 430, second central body 410 and into intermediate portion 270. Second channel 494 is in communication with a third port 496 on the exterior surface of intermediate portion 270 for conducting the fluid to the exterior surface of intermediate portion 270. As disclosed in more detail hereinbelow, second channel 494 is also in fluid communication with fluid supply conduit 200b for supplying the fluid to second channel 494.

Still referring to FIGS. 4 and 4A, surrounding first central body 280 is the previously mentioned seal means or generally tubular first bladder 180a which maybe formed from a resilient thermo elastomer material. First bladder 180a has an inner surface 500 that covers first port 480. One end of first bladder 180a is disposed in unthreaded portion 330 of nose member 310. This end of first bladder 180a is sized to be tightly sealingly interposed between first central body 280 and nose member 310, such sealing being preferably obtained by a press fit. The other end of first bladder 180a is disposed in unthreaded portion 360 of intermediate portion 270. This end of first bladder 180a is sized to be tightly sealingly interposed between first central body 280 and intermediate portion 270, such sealing being preferably obtained by a press fit. Thus, first bladder 180a is sealingly connected to first central body 280 so that the interface between first central body 280 and the opposite ends of first bladder 180a is leak-tight as first bladder 180a is expansively pressurized, in the manner described hereinbelow.

Referring again to FIGS. 4 and 4A, surrounding second central body 410 is the previously mentioned seal means or generally tubular second bladder 180b which also may be formed from the resilient thermo elastomer material mentioned hereinabove. Second bladder 180b has an inside surface 510 that covers second port 490. One end of second bladder 180b is disposed in unthreaded portion 380 of intermediate portion 270. This end of second bladder 180b is sized to be tightly sealingly interposed between second central body 410 and intermediate portion 270, such sealing being preferably obtained by a press fit. The other end of second bladder 180b is in unthreaded portion 450 of connector 430. This end of second bladder 180b is sized to be tightly sealingly interposed between second central body 410 and connector 430, such sealing being preferably obtained by a press fit. Thus, second bladder 180b is sealingly connected to second central body 410, so that the interface between second central body 410 and the opposite ends of second bladder 180b is leak-tight as second bladder 180b is expansively pressurized in the manner described hereinbelow. As bladders 180a/b are pressurized to radially expand and intimately engage inner diameter 70 of tube 50, they will define a sealed annular chamber 515 therebetween (see FIG. 4A), the purpose of bladders 180a/b is provided hereinbelow.

Figure 5:
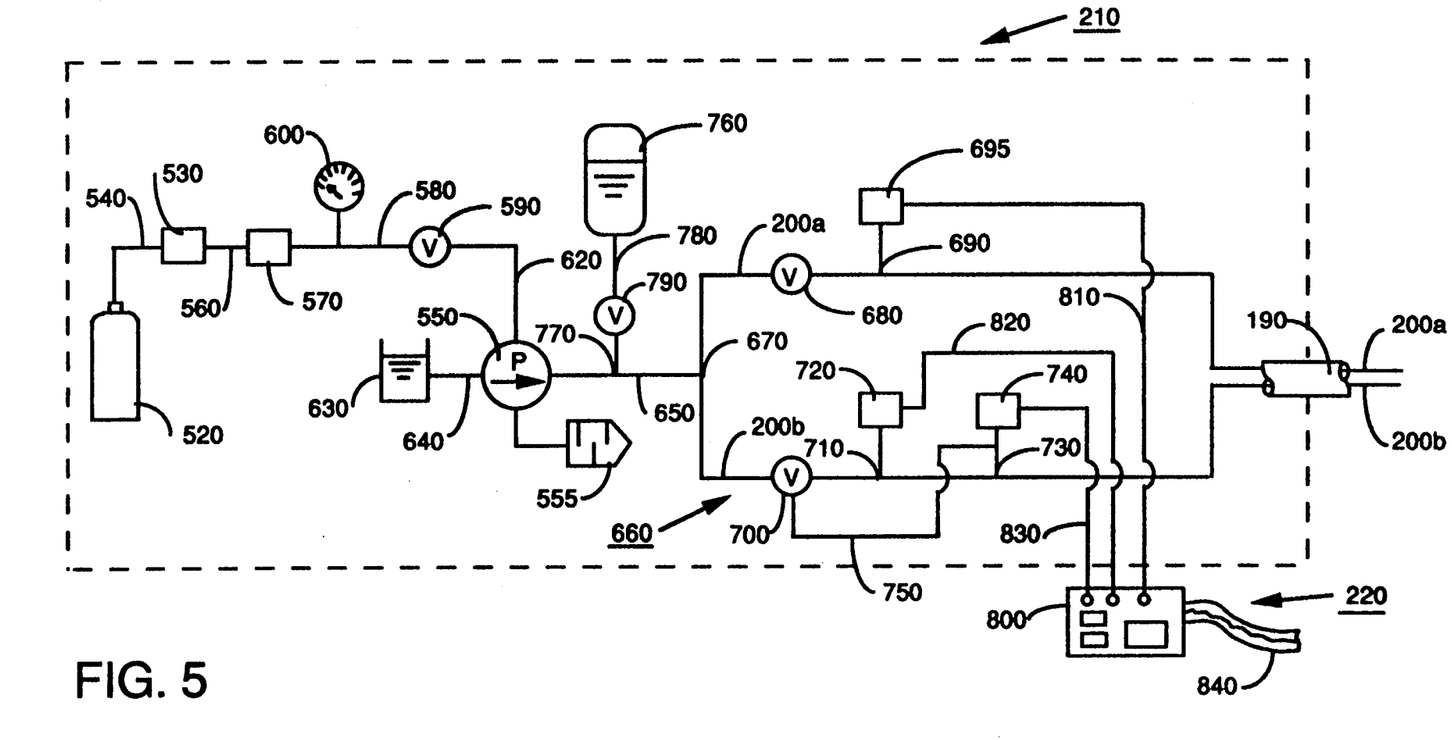
FIG. 5 illustrates fluid supply means in fluid communication with the bladders and with the chamber for pressurizing the bladders and the chamber.

Referring now to FIG. 5, system 160 further comprises the previously mentioned fluid supply means 210 which supplies fluid to mandrel 170. In this regard, fluid supply means 210 includes a pressurized gas fluid reservoir, such as a compressed air supply 520, connected to a suitable filter 530, such as by a pipe 540. Filter 530 filters the air stream passing through pipe 540 in order to remove any dirt water and foreign particulate matter therefrom. The purpose of air supply 520 is to operate an air pump 550, for reasons disclosed hereinbelow. It is important that filter 530 remove the dirt, water and foreign particulates from the air stream in order to sustain the operating life of air pump 550. Sustaining the operating life of air pump 550 ensures that the pressure of the fluid exiting pump 550 is repeatable. Air operated pump 550 has a muffler device 555 associated therewith for exhausting the air supplied to air operated pump 550. Filter 530 is connected, such as by a pipe 560, to an air regulator 570. The filtered air flows from filter 530, through pipe 560 and into air regulator 570. From air regulator 570, the air flows into a pipe 580 interconnecting air regulator 570 and a first valve 590. Air regulator 570 is adapted to regulate or control the pressure of the air passing into pipe 580. First valve 590 may be a solenoid valve. A pressure gauge 600 may be in fluid communication with pipe 580, as at location 610, for displaying the air pressure in pipe 580 to the operator of system 160. A pipe 620 interconnects first valve 590 with air operated pump 550.

Still referring to FIG. 5, air operated pump 550 is capable of pumping an incompressible fluid or liquid (e.g., water, oil or the like) from a liquid reservoir 630 which is connected to it, such as by pipe 640. Pump 550 is itself connected, such as by a pipe 650, to what is termed herein a "dual flow circuit", generally referred to as 660 Pipe 650 is connected to dual flow circuit 660 as at location 670. Dual flow circuit 660 includes the previously mentioned first fluid supply conduit 200a, which first conduit 200a supplies the liquid to first channel 470. Dual flow circuit 660 also includes the previously mentioned second fluid supply conduit 200b, which second conduit 200b supplies the liquid to second channel 494. Disposed in first conduit 200a is a second valve 680, which may be a solenoid valve. Connected to first conduit 200a, as at location 690 downstream of second valve 680, is a first pressure transducer 695 for sensing the liquid pressure in first conduit 200a as the liquid flows through first conduit 200a. In addition, disposed in second conduit 200b is a third valve 700, which also may be a solenoid valve. That is, third valve 700 is capable of adjusting the pressure of the liquid flowing in second conduit 200b in order to adjust or ramp the pressure in chamber 515 to a predetermined value. Connected to second conduit 200b, as at location 710 downstream of third valve 700, is a flow meter 720 for measuring the flow of the liquid in second conduit 200b. Moreover, connected to second conduit 200b, as at location 730 downstream of flow meter 720, is a second pressure transducer 740 for sensing the pressure of the liquid in second conduit 280b as the liquid flows through second conduit 280b. In addition, interconnecting second pressure transducer 740 and third valve 700 may be a "feedback loop" in the form of an electrical conductor wire 750 for controlling the operation of third valve 700 in order to control the flow rate (and thus the pressure) of the liquid flowing in second conduit 200b. In addition, interconnecting second pressure transducer 740 and third valve 700 may be a "feedback loop" in the form of an electrical conductor wire 750. In this regard, the following will describe the manner in which pressure transducer 740 interfaces or cooperates with third valve 700. Third valve 700, which controls the pressure, provides an output pressure proportional to its electrical command signal input. Furthermore, interconnecting pipe 650 and an accumulator tank 760, as at location 770, is a pipe 780 having a fourth valve 790 disposed therein for controlling the flow of liquid to and from accumulator tank 760. Fourth valve 790 may be a solenoid valve. As shown in FIG. 5, accumulator tank 760 has a predetermined amount of liquid therein for maintaining the liquid pressure in pipe 650 and thus for maintaining the liquid pressure in dual fluid supply circuit 660, which is connected to pipe 650. The presence of accumulator tank 760 will dampen inadvertent pressure spikes in fluid supply means 210. More specifically, the purpose of accumulator tank 760 is to remove or smooth-out pressure spikes or pulsations produced by the double-acting reciprocating air pump 550. The presence of accumulator tank 760 allows for accurate control and measurement of the pressure and fluid flow in fluid supply means 210.

Referring yet again to FIG. 5, system 160 further comprises the previously mentioned control means 220 electrically connected to fluid supply means 210 for controlling fluid supply means 210. Control means 220 includes a controller 800 electrically connected, such as by an electrical conductor wire 810, to first pressure transducer 695 for measuring and recording the liquid pressure sensed by first pressure transducer 695. Controller 800 is also electrically connected, such as by an electrical conductor wire 820, to flow meter 720 for measuring and recording the flow rate of the liquid metered by flow meter 720. Moreover, controller 800 is electrically connected, such as an by electrical conductor wire 830, to second pressure transducer 740 for measuring and recording the pressure sensed by second pressure transducer 740. Controller 800 includes display means, such as a paper strip chart 840, for displaying the flow rate and pressures measured and recorded by controller 800. Controller 800 may be computerized for automatically measuring and recording the flow rate and pressures and for automatically controlling fluid supply means 210.

OPERATION

The operation of system 160 will be described with respect to establishing the previously mentioned database.

In this regard, steam generator 10 is first removed from service in a manner well understood in the art and system 160 is transported sufficiently near steam generator 10 to perform the leak test.

In this regard, hose driver 230 is connected to manway 130 and support mechanism 240 is installed in outlet plenum chamber 110 (or inlet plenum chamber 120). The hose driver 230 and support mechanism 240 are used in the customary manner to translate an eddy current probe (not shown) in tube 50 for detecting the location of the degraded portion (not shown) of tube 50. As the eddy current probe encounters the degraded portion of tube 50, it will generate a voltage amplitude uniquely characteristic of the degradation. This voltage amplitude is suitably recorded, such as in a data base. The eddy current probe is then withdrawn from tube 50.

Next, mandrel 170 is inserted through manway 130 and into outlet plenum chamber 110 (or into inlet plenum chamber 120), whereupon it is engaged by support mechanism 240 for aligning the longitudinal axis of mandrel 170 with the longitudinal axis of tube 50. Wheels 235 of hose driver 230 are caused to engage hose 190 and rotate so that mandrel 170 advances to the location of the degradation in tube 50 identified by the previously mentioned eddy current probe. In this regard, mandrel 170 is advanced in tube 50 such that intermediate portion 270 is positioned adjacent the degradation.

Next, fluid supply means 210 is operated to radially expand bladders 180a/b into intimate sealing engagement with inner diameter 70 of tube 50, such that annular sealed chamber 515 is defined therebetween. More specifically, first valve 590, second valve 680 and fourth valve 790 are opened as third valve 700 is closed. Compressed air supply 520 is then operated to supply compressed or pressurized air into pipe 540, through filter 530, through pipe 560, through air regulator 570, through open first valve 590 and to air operated pump 550. As air operated pump 550 operates, it withdraws the water from fluid reservoir 630, which water flows through pipes 640 and 650 to be received by dual flow circuit 660. The water then flows through first conduit 200a, through open second valve 680 and to first channel 470 which is formed in mandrel 170. After passing into first channel 470, the water will exit first and second ports 480a/490 to pressurize bladders 180a/b, respectively, so that bladders 180a/b sealingly engage inner diameter 70 to define sealed annular chamber 515 therebetween.

After bladders 180a/b are thusly pressurized to a first predetermined pressure (e.g., approximately 4,000 psia), second valve 680 is closed and third valve 700 is opened to precisely pressurize chamber 515 to a second predetermined pressure, which second predetermined pressure may be the anticipated pressure during normal operation or during a main steam line break accident (e.g., approximately 2,750 psia). Third valve 700 is capable of adjusting or ramping the pressure in second conduit 200b so that any number of second predetermined pressures are obtainable. As the water is pumped to dual flow circuit 660, it will flow through second conduit 200b, through open third valve 700 and to second channel 494 in mandrel 170.

As chamber 494 is pressurized, the pressurized water therein will leak, seep or flow out chamber 494 through any through-wall crack (not shown) adjacent chamber 494. However, as the water flows through the crack, the inventory of water in chamber 494 will remain constant because fluid supply means 210 will continue to supply water to chamber 494 to maintain the predetermined pressure therein. Moreover, because the water inventory in chamber 494 remains constant, the flow rate of the water supplied through second fluid supply conduit 200b must necessarily exactly equal the flow rate of the water flowing through the crack in the degraded portion of tube 50. Thus, it will be appreciated from the description hereinabove, that measuring the flow rate of the water flowing through second conduit 200b will simultaneously exactly measure the flow rate of the water flowing through the crack. It will also be appreciated from the description hereinabove, that the pressure in chamber 515 must necessarily exactly equal the pressure in second conduit 200b.

The flow rate of the water flowing through second conduit 200b is measured and recorded by controller 800, which is electrically connected to flow meter 720 that is in turn hydraulically connected to second conduit 200b. Moreover, the pressure in chamber 515 is also measured and recorded by controller 800, which is electrically connected to second pressure transducer 740 that is in turn hydraulically connected to conduit 200b. In this manner, the flow rate of the water through the crack and the pressure in chamber 555 are precisely measured by controller 800. Controller 800 also displays and records, such as by the paper strip chart 840, the flow rate through the crack and the pressure in chamber 515.

Thus, it will be understood that three empirical data values are obtainable characterizing the crack in tube 50. First, the eddy current measurement provides a voltage amplitude value uniquely associated with the crack. Second, at least one value of pressure (i.e., the predetermined pressure in chamber 515) has been obtained. Third, at least one value of the flow rate of the water through the crack at the pressure in chamber 515 has been obtained. Of course, a plurality of pressure values and associated flow rates corresponding to each of a plurality the voltage amplitude readings are preferably measured and recorded in order to establish a suitable data base. That is, an eddy current voltage amplitude measurement for each of a plurality of degraded portions of the same tube or different tubes may be taken and the leak-tightness testing process repeated for each voltage amplitude reading.

Such a data base may be used to conveniently determine the anticipated flow rate at a given pressure through a crack in a heat exchanger tube belonging to an operating nuclear steam generator simply by performing an eddy current measurement on the tube. That is, an eddy current measurement is performed on the tube to obtain a voltage amplitude value uniquely associated with a degraded portion thereof. Next, that voltage amplitude value and the anticipated tube pressure expected during normal operation or during a postulated accident (e.g., main steam line break) are looked-up or found in the previously established data base. The data base will therefore provide the flow rate through the crack corresponding to the measured voltage amplitude and postulated pressure.

It will be appreciated from the description hereinabove, that an advantage of the present invention is that the empirical leak-rate data for satisfying Draft Regulatory Guide 1.121 (NUREG-1477) can now be obtained in a cost effective manner. This is so because the not inconsiderable expense associated with constructing a bench-scale model steam generator for testing is avoided because the testing is performed on full-sized heat transfer tubes. In addition, the expense associated with removing leaking full-sized steam generator tubes for testing is also avoided because, by use of the invention, such leaking tubes are examined in situ.

It will also be appreciated from the description hereinabove, that another advantage of the present invention is that tube leak-rate data are now precisely obtainable. This is so because leak-rate testing is performed directly on an actual tube disposed in an operating full-sized steam generator, rather than on a bench-scale model steam generator tube which may or may not evince the true tube characteristics existing in an operating full-sized steam generator. Also, the data obtained by use of the invention are more precise for yet another reason. That is, if tubes are removed from a full-sized steam generator for testing, there is a risk that the morphology of the degraded portion of the tube will be different after removal than before removal. This leads to imprecise tube testing data. By use of the invention, the risk of change in tube morphology is avoided because the tube is tested in situ.

Although the invention is illustrated and described herein in its preferred embodiment, it is not intended that the invention as illustrated and described be limited to the details shown, because various modifications may be obtained with respect to the invention without departing from the spirit of the invention or the scope of equivalents thereof. For example, a suitable eddy current coil may be integrally attached to mandrel 170 for obtaining the required voltage amplitude, rather than using a separate inspection instrument for performing the eddy current measurement. Moreover, although system 160 is described as suitable for leak-rate testing a nuclear steam generator heat transfer tube, system 160 is also usable whenever in situ leak-rate testing of a tubular member is desired.

Therefore, what is provided are a system and method for in situ testing of the leak-tightness of a tubular member, which tubular member may be a heat transfer tube of the kind found in typical nuclear steam generators.

What is claimed is:

1. A system for in situ testing of the leak-tightness of a tubular member, comprising:
   (a) a body insertable into the tubular member;
   (b) seal means surrounding said body for sealingly engaging the tubular member to define a sealed chamber in the tubular member to define a sealed chamber in the tubular member;
   (c) fluid supply means in fluid communication with the chamber for supplying a fluid to the chamber to pressurize the chamber to a predetermined pressure;
   (d) control means connected to said fluid supply means for controlling said fluid supply means, so that the predetermined pressure is continuously maintained in the chamber as a breach in the tubular member allows the fluid to leak from the chamber; and
   (e) pressure dampening means connected to said fluid supply means for dampening pressure spikes in said fluid supply means.

2. The system of claim 1, wherein said fluid supply means comprises a flow meter connected thereto for measuring the flow rate of the fluid supplied by said fluid supply means.

3. A system for in situ testing of the leak-tightness of a wall portion of a tubular member, comprising:
   (a) an elongate body insertable into the tubular member;
   (b) spaced-apart radially expandable seal means surrounding said body for sealingly engaging the wall portion, so that a sealed annular chamber is defined in communication with the wall portion as said seal means engages the wall portion;
   (c) fluid supply means in fluid communication with the chamber for supplying a fluid to the chamber to pressurize the chamber to a predetermined pressure;
   (d) control means connected to said fluid supply means for controlling said fluid supply means, so that said fluid supply means controllably supplies the fluid to the chamber to continuously maintain the predetermined pressure in the chamber as a breach in the wall portion in communication with the chamber allows the fluid to leak from the chamber; and
   (e) pressure dampening means connected to said fluid supply means for dampening pressure spikes in said fluid supply means.

4. The system of claim 3, wherein said fluid supply means comprises a flow meter connected thereto for measuring the flow rate of the fluid supplied by said fluid supply means, so that the flow rate of the fluid through the breach equals the flow rate of the fluid supplied by said fluid supply means and so that the flow rate of the fluid supplied by said fluid supply means is measured by said flow meter in order to measure the flow rate of the fluid through the breach.

5. The system of claim 3, wherein said control means comprises a computer for automatically controlling said fluid supply means.

6. In a nuclear heat exchanger having a plurality of heat transfer tubes disposed therein, a system for in situ testing of the leak-tightness of a predetermined one of the tubes, the predetermined tube having a wall portion having an inner diameter, the system comprising:
   (a) an elongate mandrel insertable into the tube, said mandrel having an exterior surface thereon and a first channel therein in communication with a first port and a second port on the exterior surface, said mandrel having a second channel therein terminating in a third pore on the exterior surface intermediate the first port and second port;
   (b) an expandable first bladder and an expandable second bladder surrounding said mandrel and covering the first port and the second port, respectively, for sealingly engaging the inner diameter of the wall portion, so that a sealed annular chamber in communication with the third port and bounded by said first bladder and said second bladder is defined adjacent the wall portion as said first bladder and said second bladder expand to engage the inner diameter of the wall portion;

(c) fluid supply means in fluid communication with the chamber and with said first bladder and said second bladder for supplying a liquid thereto, said fluid supply means including:
  (i) a flexible first conduit for conducting the liquid therethrough, said first conduit having a first end thereof connected to the first channel and having a second end;
  (ii) a pressurized liquid reservoir connected to the second end of said first conduit for supplying a pressurized liquid through said first conduit and to the first channel, so that the liquid flows through the first channel and out the first port and the second port to expand said first bladder and said second bladder, respectively, to a first predetermined pressure for sealingly engaging said first bladder and said second bladder with the inner diameter;
  (iii) a flexible second conduit for conducting the liquid therethrough, said second conduit having a first end thereof connected to the second channel and having a second end connected to the fluid reservoir for supplying the pressurized liquid through said second conduit and to the second channel, so that the liquid flows through the second channel and out the third port to pressurize the chamber to a second predetermined pressure;
(d) a controller connected to said first conduit for controlling the fluid flow rate therethrough in order to maintain the first predetermined pressure in said first bladder and said second bladder, and connected to said second conduit for controlling the fluid flow rate therethrough in order to maintain the second predetermined pressure in the chamber as a breach in the wall portion adjacent the chamber allows the liquid to leak from the chamber;
(e) an accumulator tank in fluid communication with the first conduit and the second conduit for maintaining the pressure in the first conduit and the second conduit;
(f) a flexible protective hose attached to said mandrel and surrounding said first conduit and said second conduit for protecting said first conduit and said second conduit for protecting said first conduit and said second conduit from damage; and
(g) a hose driver engaging said hose for driving said hose and said mandrel connected thereto, so that said mandrel and said hose translate in the tube as said hose is driven.

7. The system of claim 6,
(a) wherein said controller comprises a first pressure transducer associated with said first bladder and said second bladder for sensing the pressure in said first bladder and said second bladder by measuring the pressure in said first bladder and said second bladder; and
(b) wherein said controller comprises a second pressure transducer associated with the chamber for measuring the pressure in the chamber.

8. The system of claim 6, wherein said controller comprises a computer for automatically controlling said fluid supply means.

9. The system of claim 6, further comprising a support mechanism connected to said mandrel and disposed completely externally to the tube for aligning said mandrel coaxially with the tube and for supporting said mandrel.

10. A method of testing the leak-tightness of a tubular member, comprising the steps of:
  (a) inserting a body into the tubular member;
  (b) defining a sealed chamber in the tubular member by engaging the tubular member with a pair of spaced-apart seals surrounding the body;
  (c) pressurizing the chamber by supplying a fluid to the chamber from a fluid supply reservoir in fluid communication with the chamber;
  (d) continuously maintaining a predetermined pressure in the chamber as a breach in the tubular member allows the fluid to leak from the chamber by controllably operating a controller connected to the fluid supply reservoir; and
  (e) dampening pressure spikes in the fluid supply reservoir by providing an accumulator tank connected to the fluid supply reservoir.

11. The method of claim 10, wherein said step of maintaining the predetermined pressure in the chamber comprises the step of sensing the pressure in the chamber by providing a pressure sensor in communication with the chamber.

12. A method of testing the leak-tightness of a wall portion of a tubular member, comprising the steps of:
  (a) inserting an elongate mandrel into the tubular member;
  (b) defining a sealed annular chamber adjacent the wall portion by sealingly engaging the wall portion with a pair of expanded spaced-apart bladders surrounding the mandrel;
  (c) pressurizing the chamber by supplying a fluid to the chamber from a fluid supply circuit in fluid communication with the chamber;
  (d) controlling the fluid supply circuit by connecting a controller to the fluid supply circuit;
  (e) continuously maintaining a predetermined pressure in the chamber as a breach in the wall portion adjacent the chamber allows the fluid to leak from the chamber by controllably supplying the fluid to the chamber, so that the leak-tightness of the wall portion is tested as the fluid leaks from the chamber; and
  (f) dampening pressure spikes in the fluid supply circuit by providing an accumulator tank connected to the fluid supply circuit.

13. The method of claim 12, wherein said step of maintaining the predetermined pressure in the chamber comprises the step of sensing the pressure in the chamber by providing a pressure sensor in communication with the chamber.

* * * * *